US008731527B1

(12) United States Patent
Naik et al.

(10) Patent No.: US 8,731,527 B1
(45) Date of Patent: May 20, 2014

(54) AUTOMATED VOICEMAIL PRESERVATION AND DELETION

(75) Inventors: Rashmi Naik, Belle Mead, NJ (US); Arulvadivel Venugopal, Franklin Park, NJ (US); Shahid Ahmed, Monmouth Junction, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 645 days.

(21) Appl. No.: 12/888,031

(22) Filed: Sep. 22, 2010

(51) Int. Cl.
*H04M 1/725* (2006.01)

(52) U.S. Cl.
USPC ...................................................... 455/412.2

(58) Field of Classification Search
USPC ............ 370/394; 340/7.2; 455/466; 709/224; 705/26.81
See application file for complete search history.

(56) References Cited

U.S. PATENT DOCUMENTS

| | | | |
|---|---|---|---|
| 5,812,780 A * | 9/1998 | Chen et al. ................... 709/224 |
| 6,072,411 A * | 6/2000 | Yoshioka ........................ 341/94 |
| 6,381,241 B1 * | 4/2002 | Ghirnikar et al. ............. 370/394 |
| 7,346,557 B2 * | 3/2008 | Matsuura ................... 705/26.81 |
| 7,509,148 B1 * | 3/2009 | Pisutha-Arnond et al. ... 455/567 |
| 2005/0198033 A1 * | 9/2005 | Malik ............................ 707/10 |
| 2006/0053279 A1 * | 3/2006 | Coueignoux ................ 713/154 |
| 2007/0206205 A1 * | 9/2007 | Suzuki .......................... 358/1.1 |
| 2008/0207176 A1 | 8/2008 | Brackbill et al. |
| 2009/0154663 A1 | 6/2009 | Thaper et al. |
| 2010/0149300 A1 | 6/2010 | Zubas et al. |
| 2010/0151834 A1 | 6/2010 | Kalbag |
| 2012/0265832 A1 * | 10/2012 | Chakra et al. ................ 709/206 |

* cited by examiner

*Primary Examiner* — Mohammad Islam (57) ABSTRACT

Computer storage media may have stored thereon a voicemail application. The voicemail application may be configured to determine whether messages in a voicemail box meet a preservation criterion. If the messages do meet the preservation criterion, the voicemail application may be configured to cause a replica of at least one of the messages to be made and stored outside of the voicemail box. After a message is replicated successfully, it may be deleted from the voice mail box.

20 Claims, 8 Drawing Sheets

Automated Voicemail Maintenance - Mailbox Threshold

Threshold for auto-preservation and deletion:
- ☐ 90%
- ☑ 80%
- ☐ 70%
- ☐ Other: _____

*Fig. 4A*

Automated Voicemail Maintenance - Age of Messages

Age of messages to be replicated (in days):
- ☐ 15
- ☑ 30
- ☐ 60
- ☐ Other: _____

AUTOMATED VOICEMAIL PRESERVATION AND DELETION

BACKGROUND

1. Technical Field

This disclosure relates to voicemail systems and to mobile communication systems.

2. Description of Related Art

Some voicemail boxes restrict the number of messages which they will store. These restrictions may be implemented in a variety of ways. For example, some voicemail boxes refuse to accept new voicemail messages after the box contains a pre-determined number of messages. Other voicemail boxes automatically delete messages after they reach a pre-determined age. Other algorithms for restricting the number of messages in voicemail boxes may also be used. Some voicemail boxes implement combinations of algorithms, such as refusing to accept new messages after a threshold has been reached and deleting messages which have reached a certain age.

These restrictive policies may lead to a user not receiving or being able to again listen to important messages.

SUMMARY

Computer storage media may have stored thereon a voicemail application. The voicemail application may be configured to determine whether messages in a voicemail box meet a preservation criterion. If the messages do meet the preservation criterion, the voicemail application may be configured to cause a replica of at least one of the messages to be made and stored outside of the voicemail box.

The voicemail box may be configured not to accept new messages when the voicemail box reaches a threshold number of messages. The preservation criterion may be based on the number of messages contained within the voicemail box, such as whether the voicemail box contains the threshold number of voicemail messages or a pre-determined number of voicemail messages which is less than the threshold number.

The voicemail application may be configured to cause the replicated messages to be deleted from the voicemail box after they are replicated.

The computer storage media may be part of a mobile communication device.

The computer storage media may instead be part of a computer server. The voicemail application may be configured to determine whether messages in each of a plurality of voicemail boxes meet a preservation criterion. If the messages in a voicemail box do meet the preservation criterion for that voicemail box, the voicemail application may be configured to cause a replica of at least one of the messages to be made and stored outside of the voicemail box.

The voicemail application may be configured to automatically make the determination about the preservation criterion and to automatically cause the replication and storage of the message each time the voicemail box receives a new message, on a periodic basis, and/or each time the voicemail application is run by a user.

The voicemail application may be configured to cause the replication and storage by causing a replica of the message to be delivered to a user of the voicemail box as an attachment to an email and/or by causing a replica of the message to be delivered to and stored within a separate email message archive system.

The voicemail box may be configured to delete messages which reach a threshold age. The preservation criterion may be based on whether one of the messages is near the threshold age.

The preservation criterion may be based on other criteria, such as a privacy attribute, urgency attribute, and/or the length of the messages.

The preservation criterion may be based on a logical combination of one or more of the foregoing criteria and/or other criteria.

The voicemail application may be configured to allow a user to set the preservation criterion through a user interface.

The voicemail application may be configured to allow a user to set the action which the voicemail application takes if the preservation criterion is met through a user interface.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
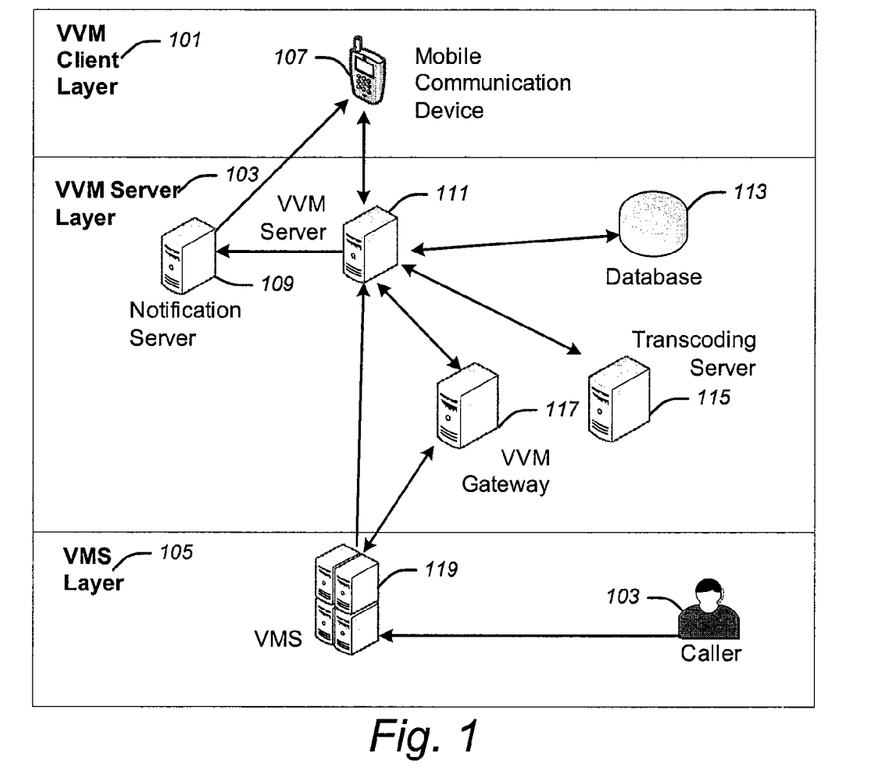
FIG. 1 illustrates an example of voicemail system components in a computer network.

FIG. 1 illustrates an example of voicemail system components in a computer network. As illustrated in FIG. 1, a voicemail system may include a visual voicemail (VVM) client layer 101, a VVM server layer 103, and a voicemail system (VMS) layer 105.

The VVM client layer 101 may include one or more mobile communication devices, such as a mobile communication device 107. The VVM server layer may include one or more notification servers, VVM servers, databases, transcoding servers, and VVM gateways, such as a notification server 109, a VVM server 111, a database 113, a transcoding server 115, and a VVM gateway 117, respectively. The VMS layer may include one or more voicemail system (VMS) servers, such as a VMS 119.

The mobile communication device 107 may be of any type. For example, the mobile communication device may consist of or include a cell phone. The mobile communication device 107 may include a wireless communication system configured to wirelessly receive voice messages, among other to send and receive other types of communications.

The mobile communication device 107 may be configured to communicate wirelessly with the VVM server 111. It may be configured to do so using protocols such as HTTPS and/or HTTP.

The mobile communication device 107 may be configured to send various requests to the VVM server 111. The VVM server 111 may be configured to respond to these requests. Information concerning these responses may be displayed in a display in the mobile communication device 107 and/or in an audible format. Examples of such requests may include a request to authenticate a password, to get the latest voicemail list, to listen to a voicemail message, to manually delete a voicemail message, to create a greeting, and/or to send a newly composed voicemail message.

The VVM server 111 may be configured to communicate all of the requests from the mobile communication device 107 to the VMS 119 via the VVM gateway 117. Responses, in turn, may be delivered by the VMS 119 to the VVM server 111 via the VVM Gateway 117 and, in turn, to the mobile communication device 107.

The VMS 119 may be configured to notify the VVM server 111 of new incoming messages. In turn, the VVM server 111 may be configured to notify the notification server 109 of these new incoming messages. In turn, the notification server 109 may be configured to notify the mobile communication device 107 of these new incoming messages.

The notification server 109 may be configured to communicate with the mobile communication device 107 using any means, such as SMS. The VVM gateway 117 may be configured to assist the VVM server 111 in fetching new messages from the VMS layer, e.g., from the VMS 119.

The VMS 119 may be configured to store and manage voicemail messages for a plurality of mobile phone service subscribers, each having their own voicemail box. Whenever a voicemail message is left for any subscriber, it may be stored within the VMS 119. The VMS 119 may be configured to respond to various requests relating to these voicemail messages which the VVM server 111 may send to it.

The database 113 may be configured to store information relating to the management of the voicemail messages which is provided to it by the VVM server 111 and, in turn, to provide all or portions of such information to the VVM server 111 when requested by the VVM server 111. The transcoding server 115 may be configured to change the format of a voicemail message which has been received by the VVM server 111 when necessary for achieving compatibility with the mobile communication device 107 and/or for other reasons.

A caller 103 may place a call to the mobile communication device 107. When the mobile communication device 107 fails to answer this call, the VMS 119 may provide the caller 103 with an opportunity to deliver and store a voicemail message for the mobile communication device 107.

Contemporaneously, the VMS 119 may send a new-message notification to the VVM server 111. In turn, the VVM server 111 may forward this new-message notification to the notification server 109. In turn, the notification server 109 may send notification of this new-message to the mobile communication device 107.

Figure 2:
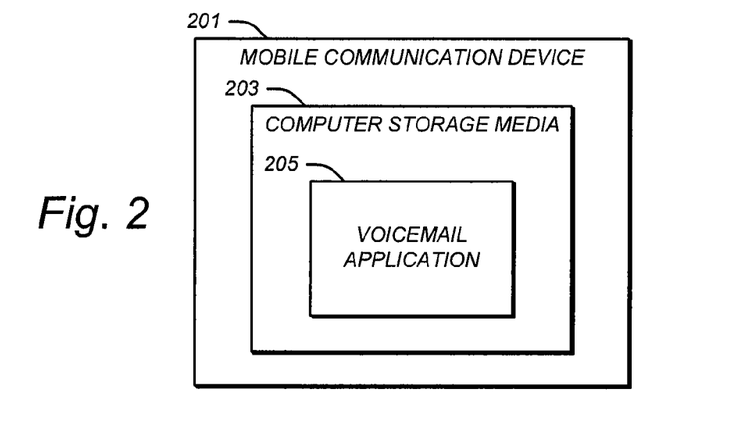
FIG. 2 illustrates a voicemail application which may be contained within the mobile communication device illustrated in FIG. 1

FIG. 2 illustrates a voicemail application 205 which may be contained within the mobile communication device 107 illustrated in FIG. 1. The mobile communication device 107 may function as the mobile communication device in connection with any other type of voicemail system. Conversely, the mobile communication device 107 may not contain the voicemail application 205 illustrated in FIG. 2.

The mobile communication device 201 may contain computer storage media 203 which may have stored therein the voicemail application 205. The computer storage media 203 may be of any type. For example, the computer storage media 203 may consist of or include one or more RAMS, ROMS, E-PROMS, hard disk drives, CD's, DVD's, and/or flash memories.

The voicemail application 205 may consist of or include one or more software applications which include algorithms, each performing one of the functions which are described herein for the voicemail application 205 when loaded in and run by a computer processing system, such as a computer processing system within the mobile communication device 107.

The voicemail application 205 may be configured to receive a new-message notification from the notification server 109 and to cause notice of this new message to be provided to a user of the mobile communication device 107, such as by causing a new-message icon to be displayed on the device mobile communication device 107 and/or by causing the mobile communication device 107 to play audible sounds indicative of such a new message.

The voicemail application 205 may be configured to receive a request from a user of the mobile communication device 107 for the new message. In turn, the voicemail application 205 may be configured to cause the mobile communication device 107 to issue a request to the VVM server 111 for the voicemail message. In turn, the VVM server 111 may be configured to pass this request onto the VVM gateway 117 which, in turn, may be configured to request the new message from the VMS 119. In turn, the VMS 119 may provide the new message to the VVM gateway 117 which, in turn, may provide it to the VVM server 111 which, in turn, may provide it to the mobile communication device 107. If the audio format of the new message is not supported by the mobile communication device 107, the VVM server 111 may use the transcoding server 115 to convert the audio format to a compatible format. The new message may then be delivered to a user of the mobile communication device 107 who may then listen to it through an audio device such as a loudspeaker.

The voicemail application 205 may be configured to determine whether the messages in the voicemail box for its mobile communication device 107 meet a preservation criterion. Generally, the preservation criterion may specify one or more criterion which are indicative of a need to preserve one or more voicemail messages which are in the voicemail box. This need may arise, for example, when these voicemail messages may soon be deleted by the VMS 119 and/or by the voicemail application 205 to make room for other messages.

To accomplish this, the voicemail application may be configured to send a query to the VVM server 111 for information about the voicemail messages which the voicemail application needs to determine whether the preservation criterion is met and to analyzed the information which is received back in response.

If the preservation criterion is met, the voicemail application 205 may be configured to cause a replica of at least one of the messages within the voicemail box to be made and stored outside of the voicemail box.

Each voicemail box in the VMS 119 may be configured not to accept new messages when the voicemail box reaches a threshold number of messages. The preservation criterion in this instance may be based on the number of messages contained within the voicemail box. More specifically, the preservation criterion may be based on whether the voicemail box contains the threshold number of voicemail messages or a pre-determined number of voicemail messages which is less than the threshold number.

The voicemail application 205 may be configured to cause the replicated messages to be deleted from the voicemail box after they have been replicated.

The voicemail application 205 may be configured to automatically make the determination about whether messages in the voicemail box meets a preservation criterion and to automatically cause the replication, storage, and/or deletion which have been discussed above each time the voicemail box receives a message, as indicated by a Notice from the Notification Server 109, on a periodic basis, each time the voicemail application 205 is run by a user of the mobile communication device 107, and/or on any other basis.

The voicemail application 205 may be configured to cause the replication and storage by causing a replica of the message to be delivered to the user of the voicemail box as an attachment to an email and/or by causing a replica of the message to be delivered to and stored within a separate email message archive system.

The voicemail box may be configured to delete messages which reach a threshold age. In this instance, the preservation criterion may be based on whether one or more of the messages is near the threshold age.

The preservation criterion may be based on any other attribute of one or more of the voicemail messages within the voicemail box. For example, the preservation criterion may be based on a privacy attribute, urgency attribute, and/or the length of the voicemail messages. The preservation criterion may be based on a logical combination of several criterion relating to the voicemail messages.

Figure 3:
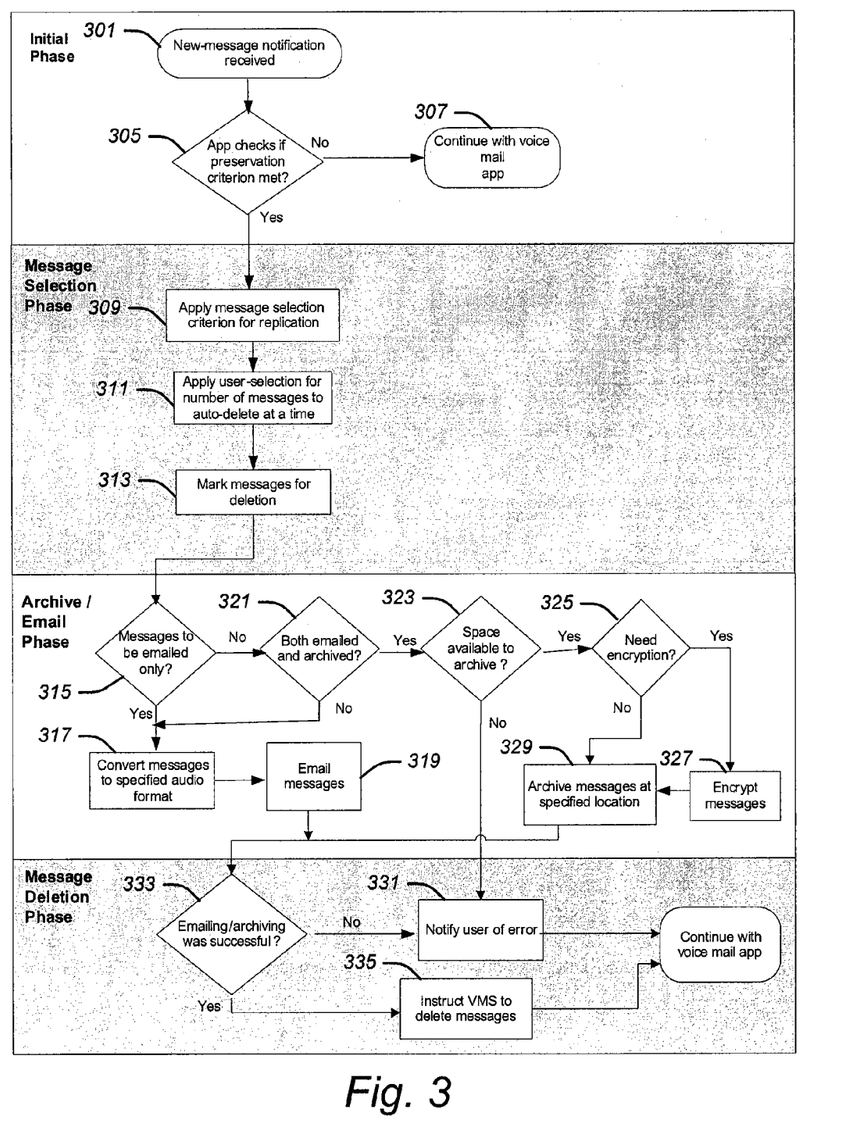
FIG. 3 illustrates an example of a voicemail preservation and deletion process which may be implemented by the voicemail application illustrated in FIG. 2.

FIG. 3 illustrates an example of a voicemail preservation and deletion process which may be implemented by the voicemail application 205 illustrated in FIG. 2. The voicemail application 205 may instead be configured to implement a different process.

A new-message notification may be received, as indicated by a New-message notification received step 301.

The voicemail application 205 may then check to determine whether a preservation criterion has been met, such as one of the preservation criteria discussed above, as reflected by an App checks if preservation criterion met? decision step 305. If not, other functions of the voicemail application 205 may continue, as reflected by a Continue with voicemail app step 307. These other functions may include routine functions such as to allow a user to manually select a voicemail for playback or deletion, to record a greeting, and/or to set various options relating to the voicemail box.

If the preservation criterion is met, on the other hand, the voicemail application 205 may apply a message selection criteria to identify the messages which are to be replicated, as reflected by an Apply message selection criterion for replication step 309. Such criterion may be specified by a user, as discussed below in connection with FIGS. 5A-5F.

User-selection criteria may next be applied for identifying messages which should be deleted, as reflected by an Apply user-selection for number of messages to auto-delete at a time step 311. The voicemail application 205 may be configured to receive this information from a user. These messages may then be marked for deletion, as reflected by a Mark messages for deletion step 315.

The voicemail application 205 may next determine how it will store the messages that will be deleted outside of the voicemail box. For example, it may first determine whether the messages are to be emailed only, as reflected by a Messages to be emailed only? decision step 315. If so, the messages may be converted to a specified audio format as reflected by a Convert messages to specified audio format step 317, and then emailed, as reflected by an Email messages step 319.

If email is not the only means of preserving the messages that will be deleted, a determination may next be made as to whether the messages are to be both emailed and archived, as reflected by a Both emailed and archived decision step 321. If so, a determination may next be made whether there is space available to archive the messages, as reflected by a Space available to archive? decision step 323. If so, a decision may next be made as to whether the archived messages should first be encrypted, as reflected by a Need encryption? decision step 325. If so, the messages may be encrypted, as reflected by an Encrypt messages step 327. The messages may then be archived at a specified location, such as in an email message archive system, as reflected by an Archive messages at specified location step 329.

If space is not available during the space available to Archive? decision step 323, a user may be notified of this problem, as reflected by a Notify user of error step 331. If, on the other hand, emailing and archiving were successful during an Emailing/archiving was successful? decision step 333, the VMS 119 may be instructed to delete the messages which have been marked for deletion, as reflected by an Instruct VMS to delete messages step 335.

As suggested by the discussion above, the voicemail application 205 may be configured to receive various settings from a user of the mobile communication device 107. This may include settings relating to the preservation criterion and/or the action which the voicemail application 205 should take if and when the preservation criterion is met.

These settings may be received through a user interface, such as through one or more dialog boxes which the voicemail application 205 may be configured to generate and manage.

FIGS. 4A-D illustrate examples of various preservation criteria which the voicemail application illustrated in FIG. 2 may allow to be set through dialog boxes.

Figure 4A:
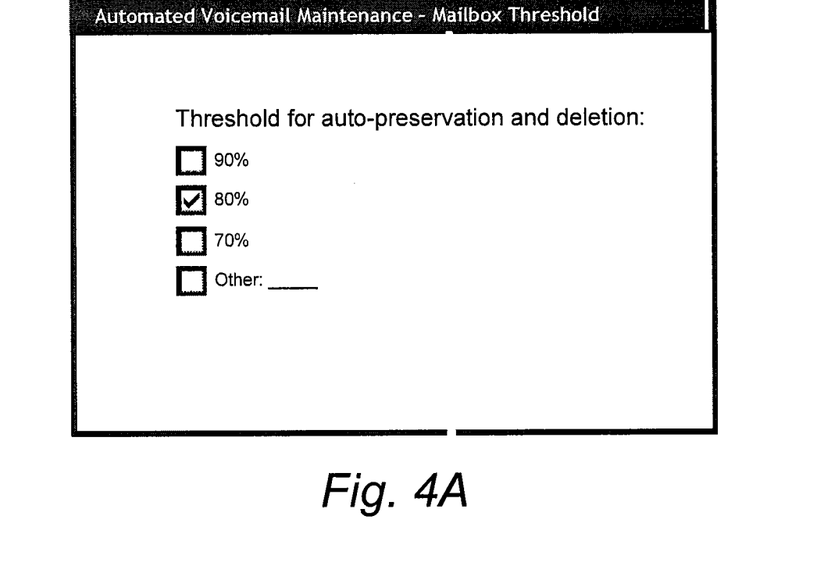
FIGS. 4A-4D illustrate examples of various preservation criteria which the voicemail application illustrated in FIG. 2 may allow to be set through dialog boxes.

FIG. 4A illustrates a dialog box which the voicemail application may present to allow a threshold for auto-preservation and deletion to be set. As illustrated in FIG. 4A, a user may set the preservation criterion so that messages are automatically preserved and deleted when the voicemail box contains 90%, 80%, 70%, or some other user-specified percentage of the maximum number of messages which the voicemail box is permitted to contain. By setting the amount to less than the maximum number, this may ensure that the voicemail box never refuses to accept a new message. The threshold may instead be specified as an absolute number of messages, rather than a percentage.

Figure 4B:
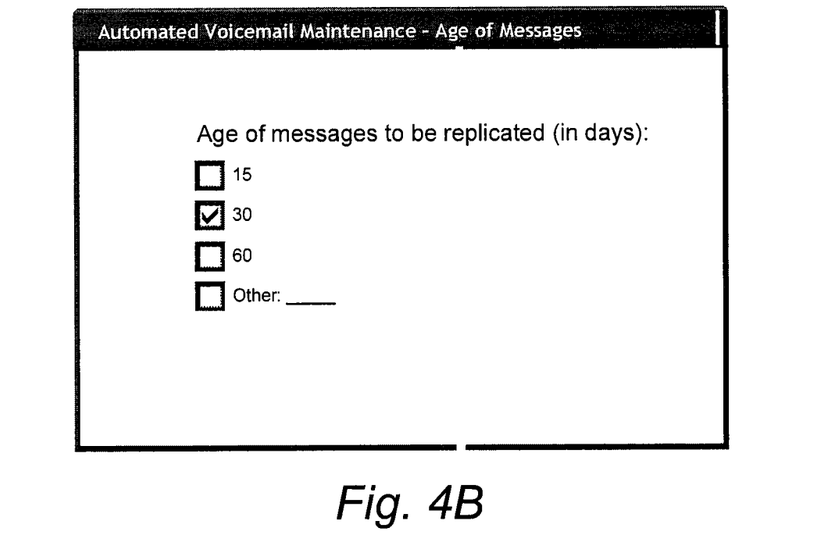

FIG. 4B illustrates a dialog box which the voicemail application may present to allow the age of messages to be replicated to be set.

Figure 4C:
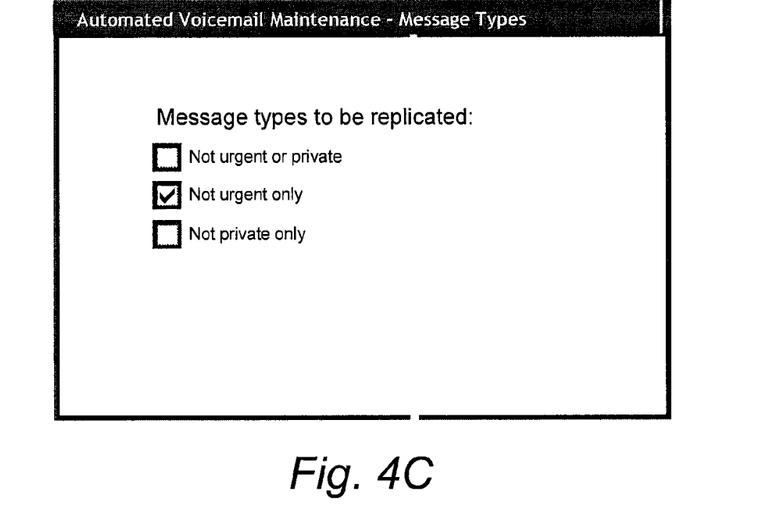

FIG. 4C illustrates a dialog box which the voicemail application may present to allow the types of messages which should be replicated to be set.

Figure 4D:
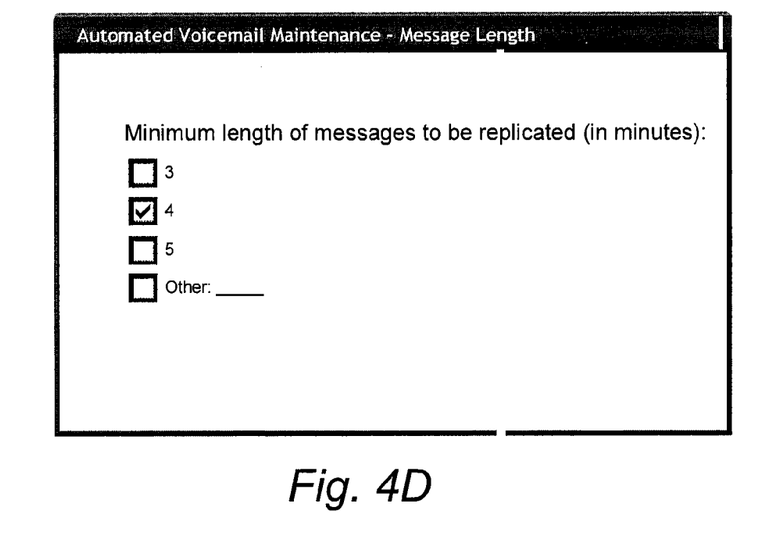

FIG. 4D illustrates a dialog box which the voicemail application may present to allow the length of messages which should be replicated to be set.

FIGS. 5A-5F illustrate examples of various actions which the voicemail application in FIG. 2 may take if the preservation criterion is met and which the voicemail application may allow to be set through dialog boxes.

Figure 5A:
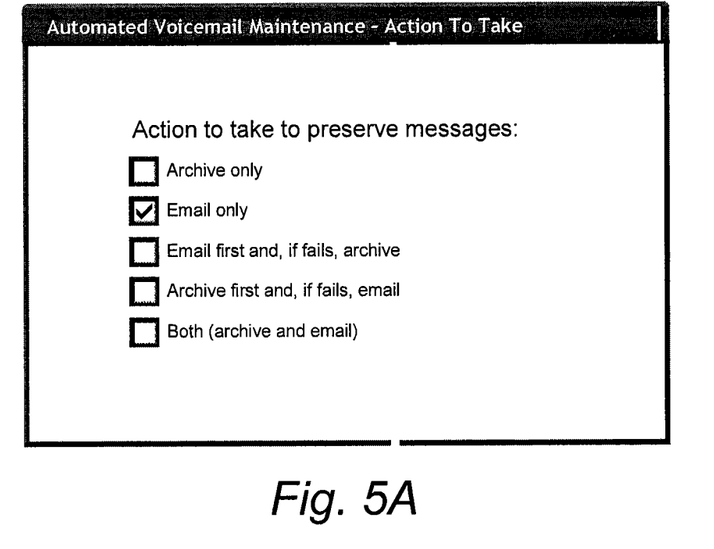
FIGS. 5A-5G illustrate examples of various actions which the voicemail application in FIG. 2 may take if the preservation criterion is met and which the voicemail application may allow to be set through dialog boxes.

FIG. 5A illustrates a dialog box which the voicemail application may present to allow the way in which a message is to be preserved to be set. Additional or different actions may be specified instead.

Figure 5B:
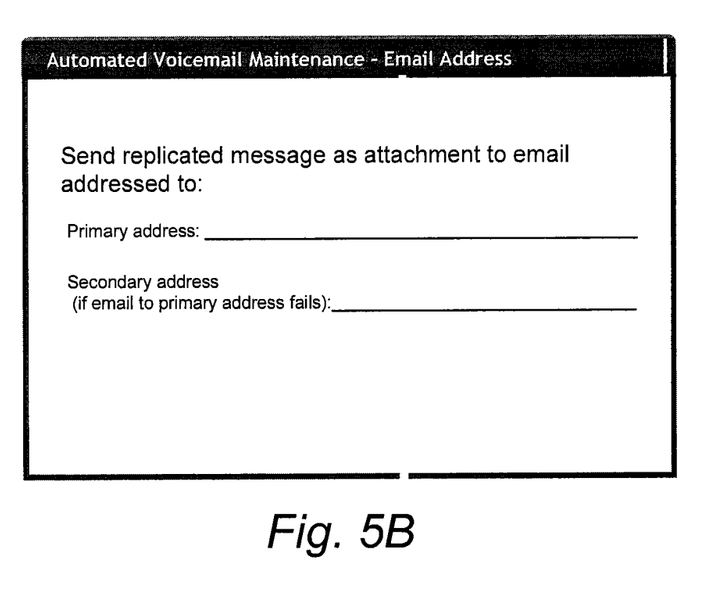

FIG. 5B illustrates a dialog box which the voicemail application may present to allow email addresses to which a replica of the messages should be sent to be set. Only a single address or multiple simultaneous addresses may be specified instead.

Figure 5C:
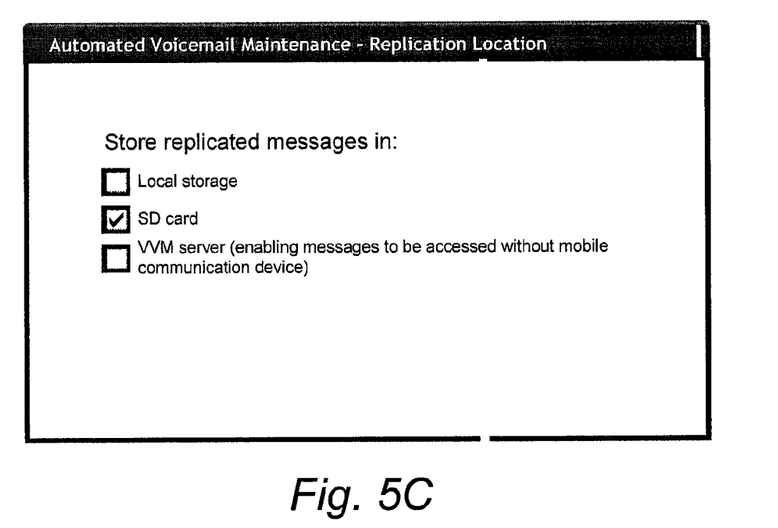

FIG. 5C illustrates a dialog box which the voicemail application may present to allow the location of where the replicated messages should be stored to be set. Other locations or types of storage devices may be specified in addition or instead.

Figure 5D:
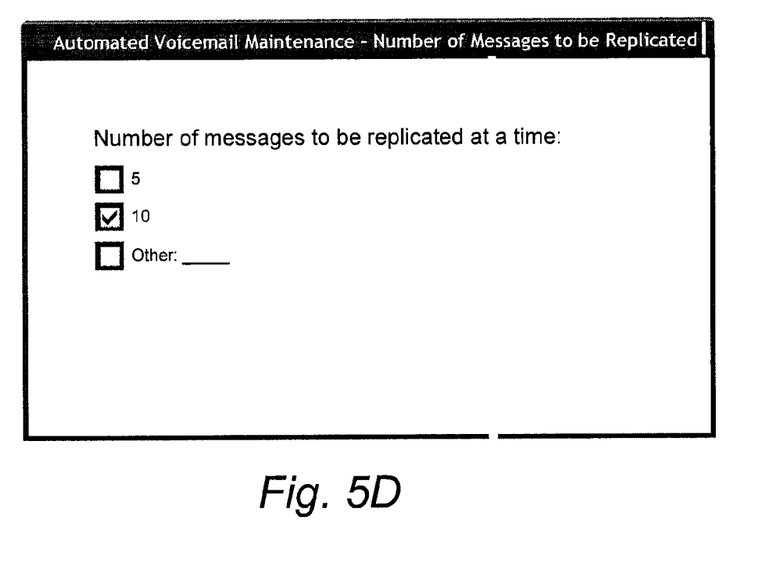

FIG. 5D illustrates a dialog box which the voicemail application may present to allow the number of messages which should be replicated to be set. Here, a user may specify how many of the messages within the voicemail box should be replicated upon detection of the preservation criterion.

Figure 5E:
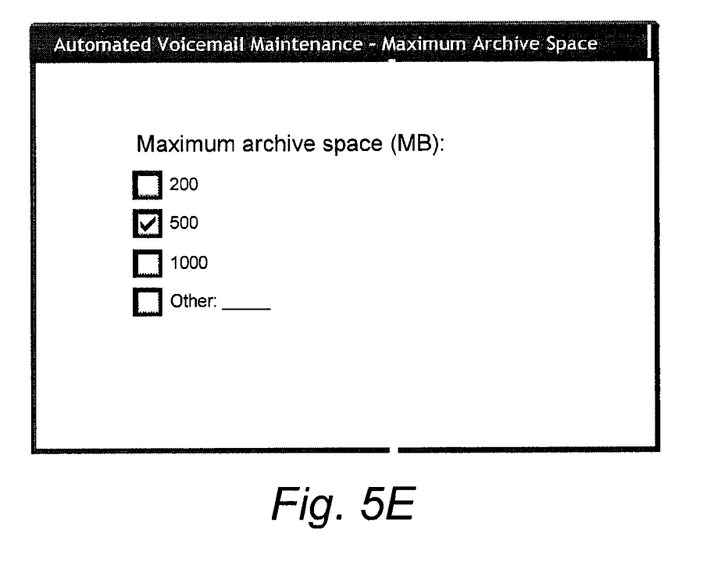

FIG. 5E illustrates a dialog box which the voicemail application may present to allow the maximum amount of archive space to be set. Here, a user may specify the maximum amount of space which may be utilized for archiving replicated voicemail messages, thereby ensuring that the computer storage media which is being used to archive replicated messages has additional space for other functions, such as to store images which might be captured by a camera in the mobile communication device 107.

Figure 5F:
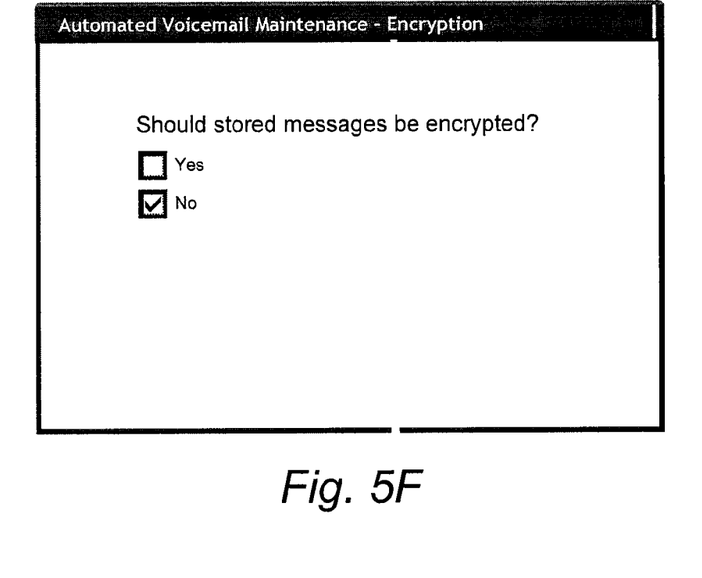

FIG. 5F illustrates a dialog box which the voicemail application may present to allow encryption of stored messages to be set.

Figure 5G:
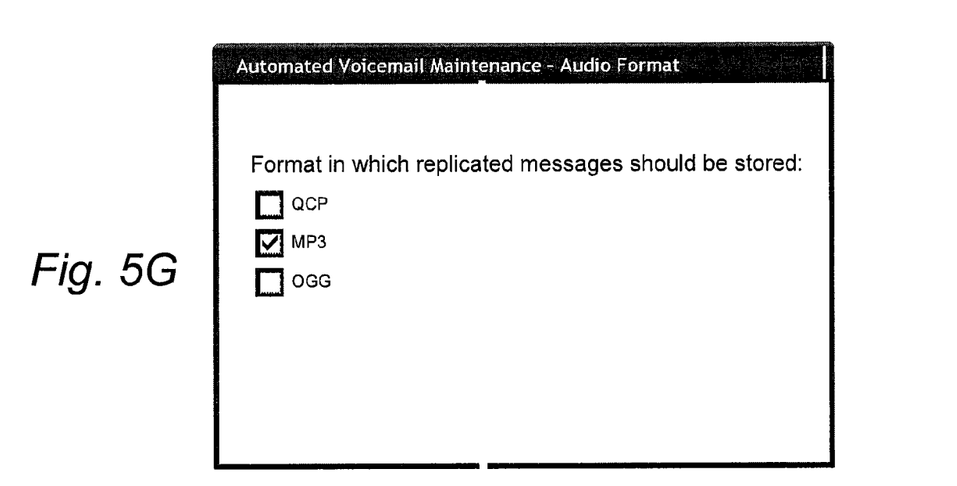

FIG. 5G illustrates a dialog box which the voicemail application may present to allow the format in which the messages should be replicated to be set. Other formats may be specified in addition or instead.

A different form of user interface may be provided to allow one or more of these user-specified settings to be set. For example, a single page of all of the settings may be presented.

The computer storage media 203 containing the voicemail application 205 has thus-far been described as being part of the mobile communication device 107. In other configurations, computer storage media containing a voicemail application may instead be part of a computer server.

Figure 6:
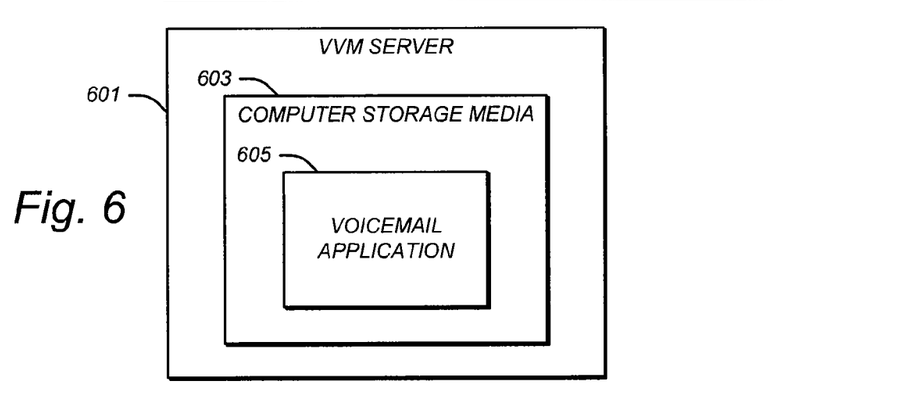
FIG. 6 illustrates a voicemail application contained within a VVM server.
Figure 7:
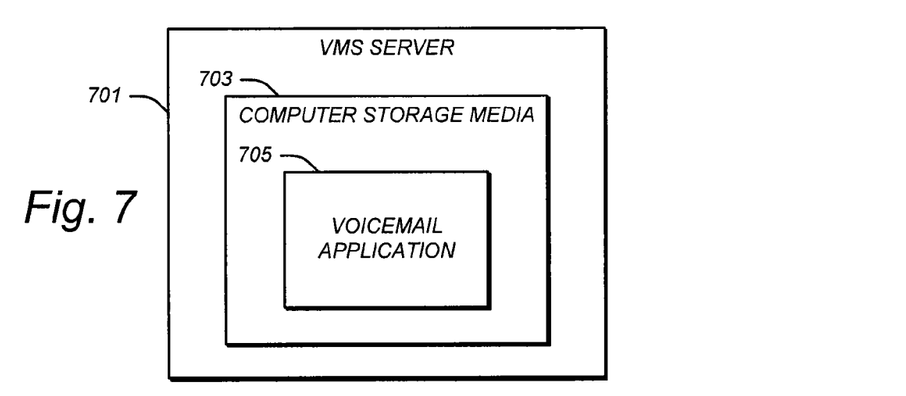
FIG. 7 illustrates a voicemail application contained within a VMS server.

FIG. 6 illustrates a VVM server 601 containing computer storage media 603 containing a voicemail application 605. FIG. 7 illustrates a VMS server 701 containing computer storage media 703 containing a voicemail application 705.

The VVM server 601 and the VMS server 701 may be the same as the VVM server 111 and the VMS 119 illustrated in FIG. 1, respectively, except for the addition of the computer storage media 603 and 703, respectively, The computer storage media 603 and 703 may similarly be any of the types discussed above in connection with the computer storage media 203.

The voicemail applications 605 and 705 may be configured to manage a plurality of voicemail boxes, one for each of several different subscribers. The voicemail applications 605 and 705 may be configured to manage each of these voicemail boxes in the same way as the voicemail application 205 manages a single voicemail box, as described above in connection with FIGS. 2-5G.

In these server-based applications, an additional voicemail application may still be contained in the mobile communication device 107. That corresponding voicemail application may be configured to perform traditional voicemail management tasks, such as providing notifications of new voice-mail messages, listing to voicemail messages, recording a greeting, and manually deleting voicemail messages, while the voicemail applications 605 and 705 may not be configured to perform these functions. The voice mail application in the mobile communication device 107 It may also be configured to receive the various types of settings which have been described above through a user interface, such as through dialog boxes as discussed above in connection with FIGS. 4A-4D and 5A-5G. It may be configured to receive these settings from a user and to deliver them to the voicemail applications 605 and 705. The voicemail applications 605 and 705 may be configured to store and implement these settings for each voicemail box which it manages. Thus, the voicemail applications 605 and 705 may be different than the voicemail application 205 in that they may not be configured to directly interface with a user, but rather receive and deliver interface information to the mobile communication device 107 related to these functions.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, voicemail application configuration parameters (such as the examples shown in FIGS. 4A-4D and 5A-C) may be set using a PC-based web browser or by calling a specific number (such as *86), commonly known as a TUI (Telephone User Interface). Instead of the days illustrated in FIG. 4B, the age of messages to be replicated may be specified in hours, weeks or other units. The options illustrated in FIG. 5C for storing replicated messages may include an online archive location. The types of messages to be replicated as illustrated in FIG. 4C may include other types, "Company confidential" or "Broadcast messages."

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. Non-transitory, tangible, computer storage medium of a mobile communication device having stored thereon a voicemail application for the mobile communication device, which voicemail application is configured to cause a processor in the mobile communication device to:
    analyze voicemail messages in a voicemail box of a voicemail server to determine whether the voicemail messages in the voicemail box cause the voicemail box to meet a mailbox preservation criterion;
    mark for deletion at least one of the voicemail messages in the voicemail box upon determining that the voicemail box meets the mailbox preservation criterion;
    analyze the voicemail messages in the voicemail box, to determine whether the one or more voicemail messages in the voicemail box meet a message preservation criterion indicating a need to preserve the one or more voicemail messages;
    mark for deletion, each one of the voicemail messages in the voicemail box determined to meet the message preservation criterion;
    cause a replica of each of the marked voicemail messages to be made; and
    cause each replicated message to be stored outside of the voicemail server.

2. The computer storage medium of claim 1 wherein the voicemail box is configured not to accept new messages when the voicemail box reaches a threshold number of messages.

3. The computer storage medium of claim 2 wherein the mailbox preservation criterion is based on the number of messages contained within the voicemail box.

4. The computer storage medium of claim 3 wherein the voicemail application is configured to cause each replicated message to be deleted from the voicemail box after the message is stored.

5. Non-transitory, tangible, computer storage medium of a computer server having stored thereon a voicemail application which application is configured to cause a processor in the server to:
    analyze voicemail messages in each voicemail box of a plurality of voicemail boxes of the server to determine whether the voicemail messages cause each of the plurality of voicemail boxes meet a mailbox preservation criterion;
    mark for deletion at least one of the of voicemail messages at least one of the voicemail boxes upon determining that the at least one of the voicemail boxes meets the mailbox preservation criterion;
    analyze the voicemail messages in one of the voicemail boxes, to determine whether one of the voicemail messages in the one voicemail box meets a message preservation criterion indicating a need to preserve the one or more voicemail messages;
    mark for deletion, the one voicemail message in the one voicemail box if the one voicemail message is determined to meet the message preservation criterion;
    cause a replica of each of the marked voicemail messages to be made; and
    cause each replicated message to be stored outside of the server.

6. The computer storage medium of claim 1 wherein the voicemail application is configured to automatically make the determination about the mailbox preservation criterion and the message preservation criterion and to automatically cause the replication and storage of any marked message each time the voicemail box receives a new message.

7. The computer storage medium of claim 1 wherein the voicemail application is configured to automatically make the determination about the mailbox preservation criterion and the message preservation criterion and to automatically cause the replication and storage of any marked message on the periodic basis.

8. The computer storage medium of claim 1 wherein the voicemail application is configured to automatically make the determination about the mailbox preservation criterion and the message preservation criterion and to automatically cause the replication and storage of any marked message each time the voicemail application is run by a user.

9. The computer storage medium of claim 1 wherein the voicemail application is configured to cause the replication and storage by causing a replica of the message to be delivered to a user of the voicemail box as an attachment to an email.

10. The computer storage medium of claim 1 wherein the voicemail application is configured to cause the replication and storage by causing a replica of the message to be delivered to and stored within an email message archive system.

11. The computer storage medium of claim 1 wherein the voicemail box is configured to delete messages which reach a threshold age.

12. The computer storage medium of claim 11 wherein the message preservation criterion is based on whether one of the messages is near the threshold age.

13. The computer storage medium of claim 1 wherein the message preservation criterion is based on a privacy attribute of the messages.

14. The computer storage medium of claim 1 wherein the message preservation criterion is based on an urgency attribute of the messages.

15. The computer storage medium of claim 1 wherein the message preservation criterion is based on the length of the messages.

16. The computer storage medium of claim 1 wherein the voicemail application includes a user interface through which a user sets a logical combination of message preservation criteria relating to the messages.

17. The computer storage medium of claim 1 wherein the voicemail application is configured to allow a user to set an action, which the voicemail application takes if the mailbox or message preservation criterion is met, through a user interface.

18. The computer storage medium of claim 1 wherein the replicated voicemail message is stored in an external storage of the mobile communication device.

19. The computer storage medium of claim 16 wherein the logical combination of message preservation criteria are selected, through the user interface, from a group consisting of: an age of the message, a type of the message, and a length of the message.

20. The computer storage medium of claim 16 wherein the user interface is configured to receive an action to be taken to preserve marked messages, the action being selected from a group consisting of: archiving, emailing if archiving fails, emailing, archiving if emailing fails and emailing and archiving.

* * * * *